(12) United States Patent
Kuo et al.

(10) Patent No.: US 11,709,336 B2
(45) Date of Patent: Jul. 25, 2023

(54) LENS DRIVING MECHANISM

(71) Applicant: TDK TAIWAN CORP., Taoyuan (TW)

(72) Inventors: Chen-Chi Kuo, Taoyuan (TW); Chao-Chang Hu, Taoyuan (TW); Sin-Jhong Song, Taoyuan (TW)

(73) Assignee: TDK TAIWAN CORP., Yangmei Taoyuan (TW)

(*) Notice: Subject to any disclaimer, the term of this patent is extended or adjusted under 35 U.S.C. 154(b) by 379 days.

(21) Appl. No.: 17/130,946

(22) Filed: Dec. 22, 2020

(65) Prior Publication Data

US 2021/0109315 A1 Apr. 15, 2021

Related U.S. Application Data

(63) Continuation of application No. 15/788,340, filed on Oct. 19, 2017, now Pat. No. 10,901,171.

(Continued)

(30) Foreign Application Priority Data

Sep. 27, 2017 (CN) .......................... 201710888582.5

(51) Int. Cl.
*G02B 7/09* (2021.01)
*G02B 13/00* (2006.01)
*G02B 27/64* (2006.01)

(52) U.S. Cl.
CPC ............. *G02B 7/09* (2013.01); *G02B 13/001* (2013.01); *G02B 27/646* (2013.01)

(58) Field of Classification Search
CPC ....... G02B 7/09; G02B 13/001; G02B 27/646
See application file for complete search history.

(56) References Cited

U.S. PATENT DOCUMENTS 7,116,902 B2  10/2006 Kayama et al.
9,766,426 B2   9/2017 Lam
(Continued)

FOREIGN PATENT DOCUMENTS

CN         102077126 A     5/2011
CN         204422843 U  *  6/2015  ........... H04N 5/2254
WO    WO 2015/132571 A1    9/2015

OTHER PUBLICATIONS

Office Action dated Apr. 23, 2021 in Chinese Application No. 201710888582.5, 5 pages.

(Continued)

*Primary Examiner* — Clayton E. LaBalle
*Assistant Examiner* — Diana Hancock
(74) *Attorney, Agent, or Firm* — Muncy, Geissler, Olds & Lowe, P.C.

(57) ABSTRACT

A lens driving mechanism is provided, including a bottom plate, a housing, connected to the bottom plate, a movable portion movably received between the housing and the bottom plate, and a biasing assembly connecting the bottom plate to the base of the movable portion. The movable portion includes a frame, a holder, and a base, wherein the holder is received in the frame and configured to sustain the optical lens, and the base is connected to the frame and the holder. The biasing assembly connects the bottom plate to the base of the movable portion, wherein when viewed in a direction perpendicular to the optical axis, the base and the biasing assembly partially overlap.

19 Claims, 9 Drawing Sheets

Related U.S. Application Data

(60) Provisional application No. 62/421,576, filed on Nov. 14, 2016.

(56)  References Cited

U.S. PATENT DOCUMENTS

| | | |
|---|---|---|
| 10,495,897 B2 | 12/2019 | Kuo et al. |
| 10,901,171 B2 * | 1/2021 | Kuo .................. G02B 7/08 |
| 2012/0154614 A1 | 6/2012 | Mariya et al. |
| 2013/0169194 A1 | 7/2013 | Larsson et al. |
| 2015/0277081 A1 | 10/2015 | Hagiwara |
| 2016/0077305 A1 | 3/2016 | Park et al. |
| 2017/0052342 A1 * | 2/2017 | Shin .................. G02B 7/08 |
| 2018/0136433 A1 | 5/2018 | Kuo et al. |
| 2018/0210163 A1 | 7/2018 | Jung et al. |
| 2018/0364445 A1 | 12/2018 | Osaka et al. |

OTHER PUBLICATIONS

Indian Office Action cited in counterpart application No. 201724040618 dated Jul. 22, 2020; pp. 1-5.
Office Action and Search Report issued in CN201710888582.5 dated Sep. 22, 2021, 8 pages.

* cited by examiner

LENS DRIVING MECHANISM

CROSS REFERENCE TO RELATED APPLICATIONS

This application is a continuation application of U.S. patent application Ser. No. 15/788,340, filed Oct. 19, 2017, which claims the benefit of U.S. Provisional Application No. 62/421,576, filed on Nov. 14, 2016, and China Patent Application No. 201710888582.5, filed on Sep. 27, 2017, the entirety of which is incorporated by reference herein.

BACKGROUND OF THE INVENTION

Field of the Invention

The application relates in general to a lens driving mechanism, and in particular to a lens driving mechanism that includes a housing configured to restrict the movement of the holder and the optical lens disposed therein.

Description of the Related Art

Thanks to ongoing technological development, the most recent electronic devices (such as tablet computers and smartphones) to be put on the market are increasingly trending toward miniaturization, and they usually include a lens module capable of aiding in photography or recording video. The demands on these increasingly indispensable electronic devices are also rapidly growing. However, an image may come out blurry if the user shakes the lens module in the electronic device. To miniaturize the electronic device and improve image quality, it is increasingly important to design a smaller and effectively shockproof lens module.

BRIEF SUMMARY OF INVENTION

To address the deficiencies of conventional products, an embodiment of the invention provides a lens driving mechanism is provided. The lens driving mechanism includes a bottom plate, a housing, connected to the bottom plate, a movable portion movably received between the housing and the bottom plate, and a biasing assembly connecting the bottom plate to the base of the movable portion. The movable portion includes a frame, a holder, and a base, wherein the holder is received in the frame and configured to sustain the optical lens, and the base is connected to the frame and the holder. The biasing assembly connects the bottom plate to the base of the movable portion, wherein when viewed in a direction perpendicular to the optical axis, the base and the biasing assembly partially overlap.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the lens driving mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
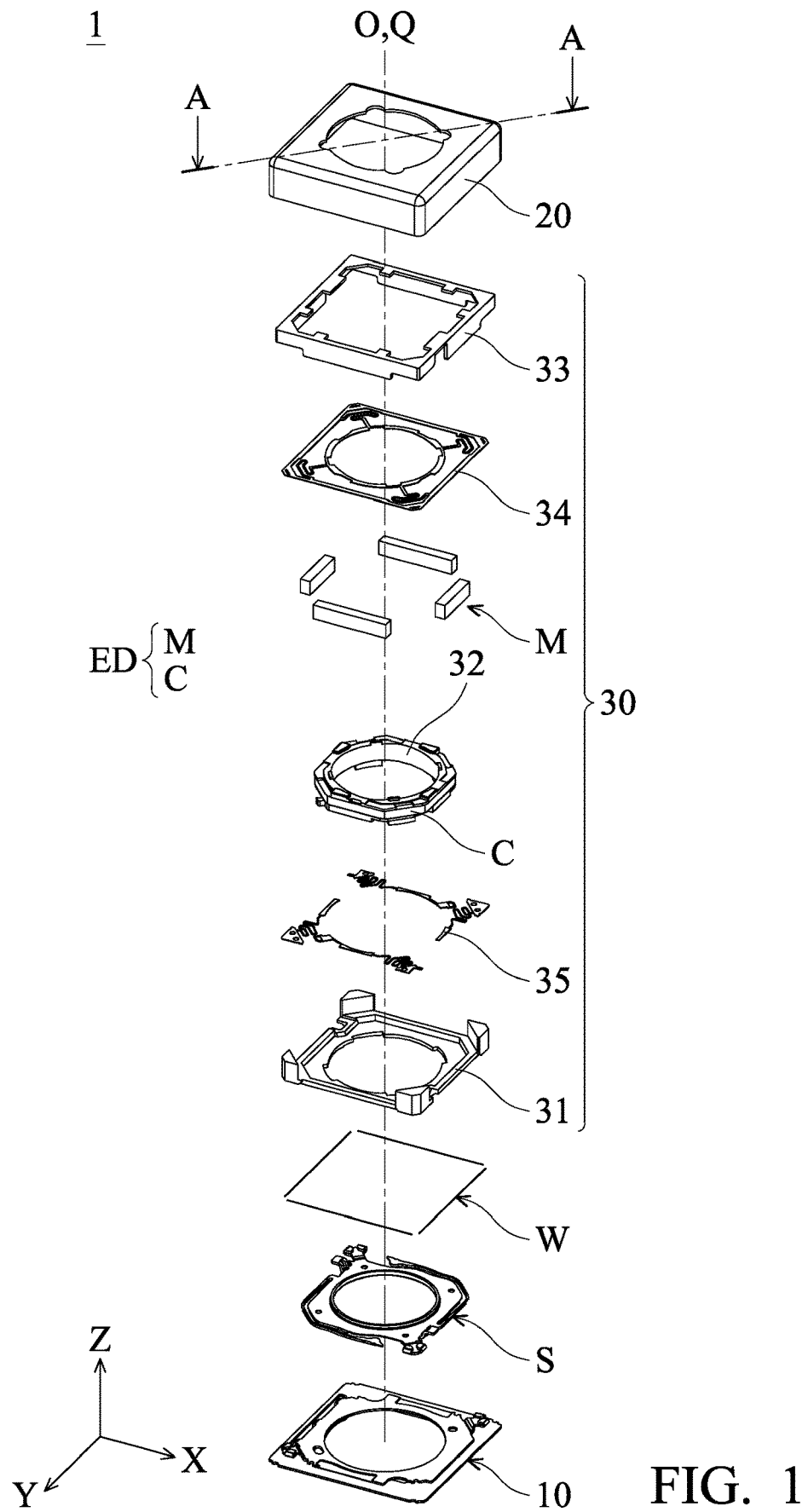
FIG. 1 is an exploded diagram of a lens driving mechanism according to an embodiment of the invention.
Figure 2:
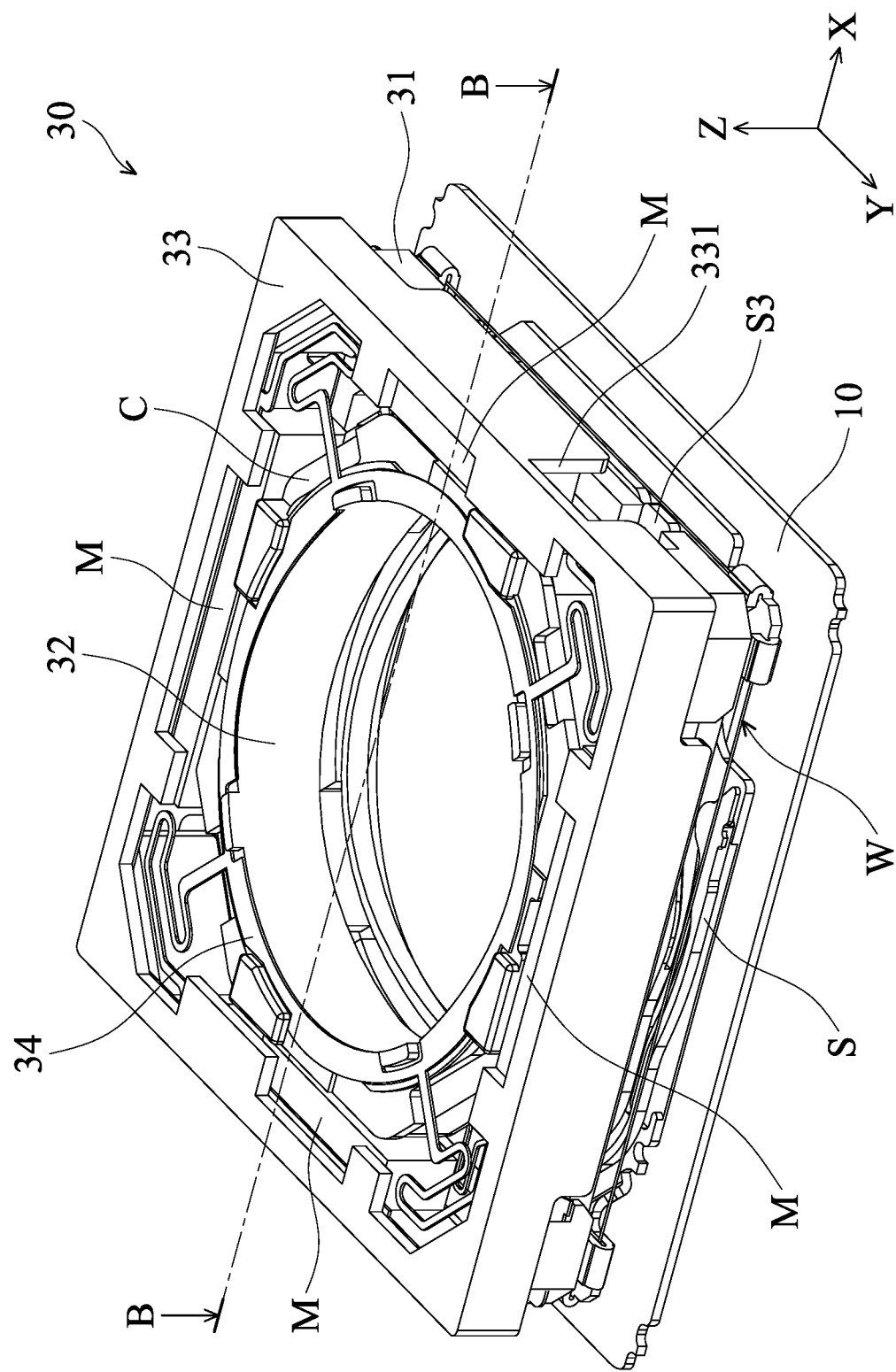
FIG. 2 is a schematic diagram of the lens driving mechanism in FIG. 1 after assembly (the housing 20 is omitted).

FIG. 1 is an exploded-view diagram of a lens driving mechanism 1 according to an embodiment of the invention, and FIG. 2 is a schematic diagram of the lens driving mechanism 1 after assembly (the housing 20 is omitted). The lens driving mechanism 1 can be disposed in an electronic device, such as a camera, a tablet computer, or a cell phone, and it can sustain an optical lens (not shown) and force (or drive) the optical lens to move relative to an image sensor disposed in the electronic device, so that the lens driving mechanism 1 has functions of auto-focusing (AF) function and optical image stabilization (OIS), to enhance image quality.

As shown in FIGS. 1 and 2, the lens driving mechanism 1 primarily comprises a bottom plate 10, a housing 20, a movable portion 30, a biasing assembly W, and an elastic member S. The housing 20 is connected to and disposed on the bottom plate 10. The movable portion 30, the biasing assembly W, and the elastic member S are disposed on the bottom plate 10 and situated in the housing 20 which is configured to protect them. The movable portion 30 can sustain an optical lens, wherein an image sensor is configured to receive light from the outside of the electronic device and through the optical lens so that an image may be acquired. The structure of the movable portion 30 is described in detail below, and the connection between the movable portion 30 and the bottom plate 10 will be described later.

Figure 3:
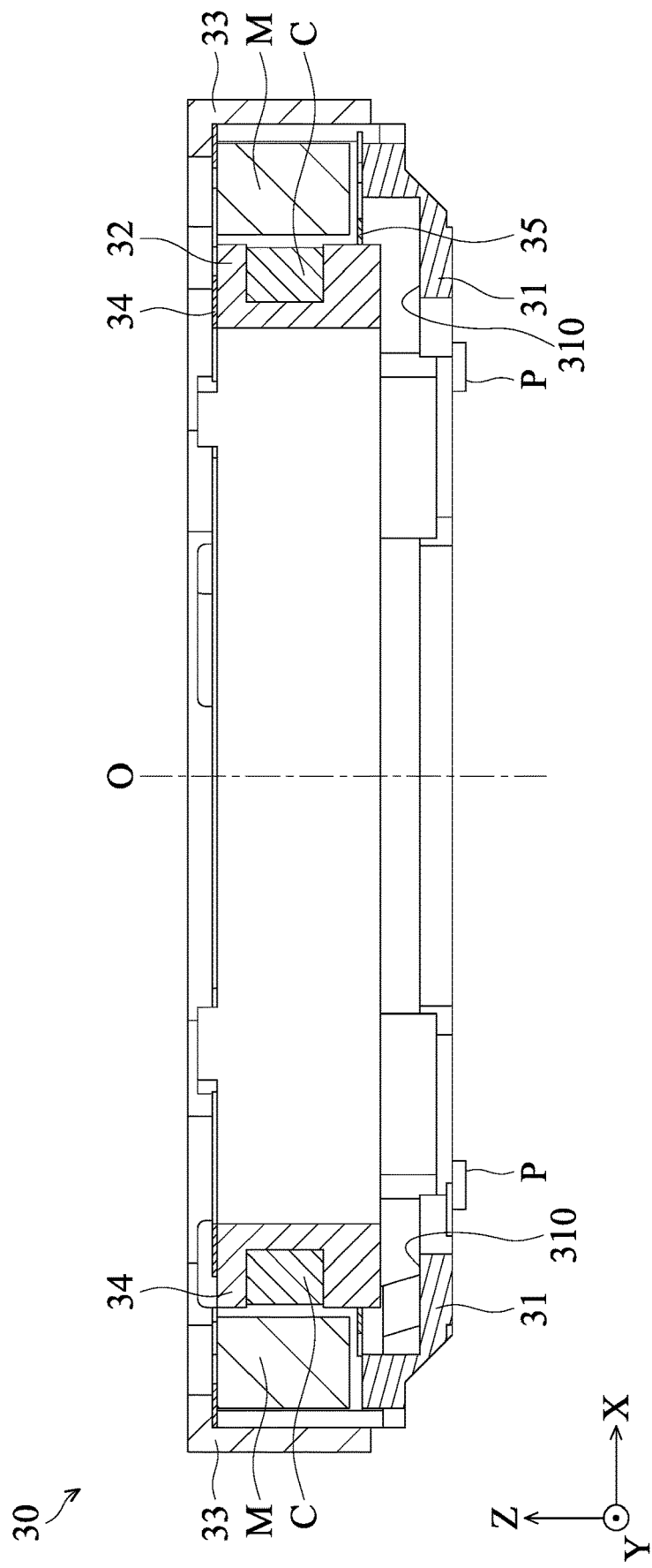
FIG. 3 is a sectional view diagram of the movable portion 30 taken along line B-B in FIG. 2.

Please refer to FIGS. 1 to 3, wherein FIG. 3 is a sectional view diagram of the movable portion 30 in FIG. 2. The movable portion 30 includes a base 31, a holder 32, a frame (inner frame) 33, an electromagnetic driving assembly ED, a first leaf spring 34, and a second leaf spring 35. The holder 32 is configured to hold an optical lens and disposed on the base 31, and the frame 33 is disposed on the holder 32. The first and second leaf springs 34 and 35 connect the holder 32 to the base 31, and the holder 32 is sandwiched therebetween. The electromagnetic driving assembly ED includes a coil C and a plurality of magnetic elements M (such as magnets) which are respectively disposed on the holder 32 and the frame 33. More specifically, the coil C is disposed around the holder 32, and four magnetic elements M are connected to the frame 33 via the upper surfaces thereof and correspond to the coil C.

Figure 4:
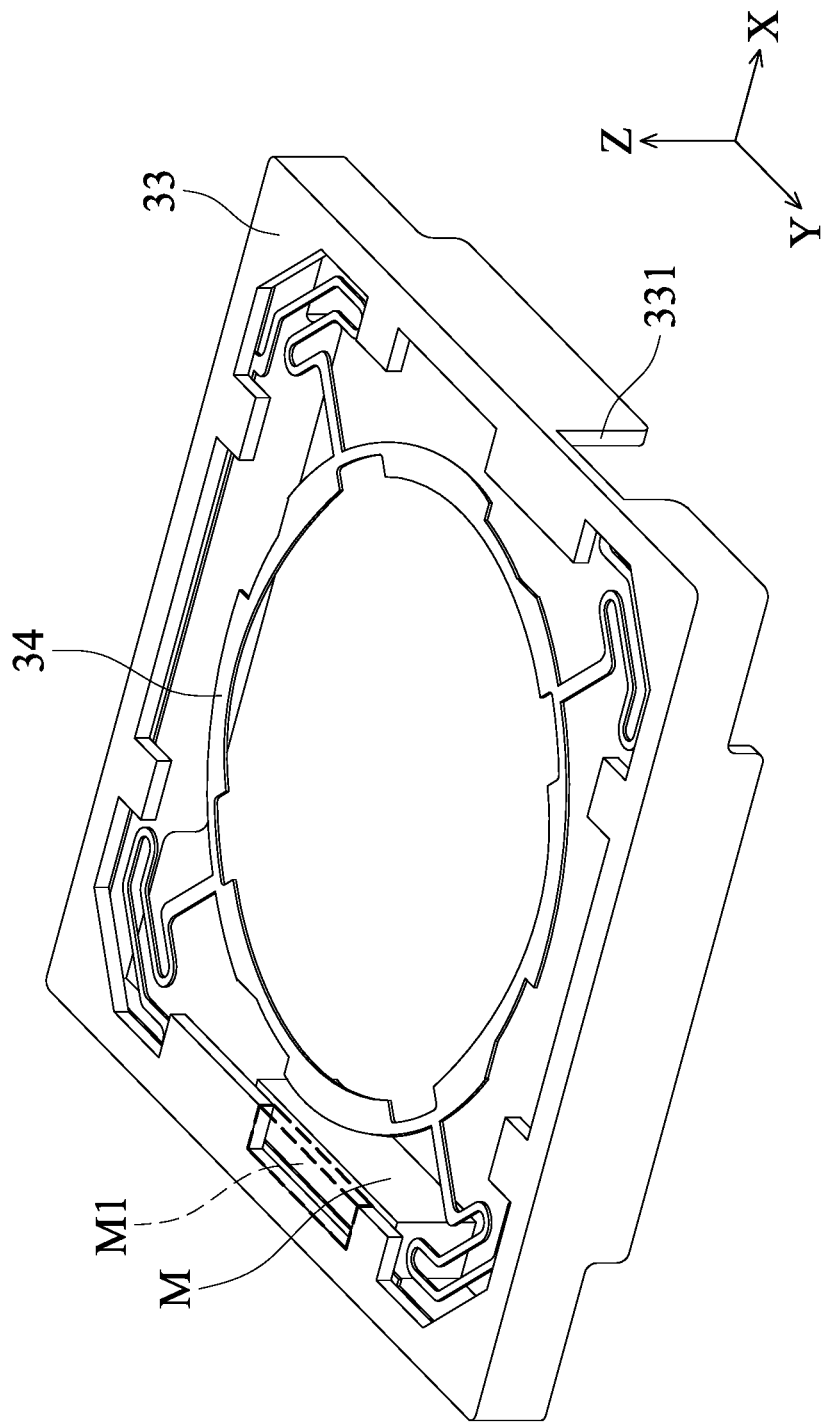
FIG. 4 is a schematic diagram of the frame assembled with one magnetic element and the first leaf spring.

It should be noted that the connection of the magnetic elements M and the frame 33 may be accomplished by applying a glue M1 (for example, a transparent glue). Specifically, as shown in FIG. 4, when the magnetic element M is provided on the frame 33, the frame 33 exposes at least a portion of the upper surface of the magnetic element M viewed from the direction of the optical axis O of the optical lens. The glue M1 can be applied directly to the upper surface of the magnetic element M from above, so that the magnetic element M is affixed (or connected; attached; adhered) to the frame 33. Therefore, since the frame 33 exposes a portion of the magnetic element M, the glue M1 can be directly applied from above. Compared to a traditional connection mechanism which the magnetic element M is adhered by the inner sidewall of the frame 33 or applying the glue M1 to the magnetic element M from below, the present embodiment has the effect of simplifying the assembly step and preventing the glue M1 from flowing down along the sidewall of the frame 33. In some embodiments, the glue M1 may fully cover the upper surface of the magnetic element M exposed by the frame 33 or partially applied to the exposed upper surface of the magnetic element M. In addition, the first leaf spring 34 provided between the magnetic element M and the frame 33 may adhere to the frame 33 via glue M1 to simplify the assembly process.

In the present embodiment, the coil C may receive one or more driving signals (such as electrical current) supplied by an external power source (not shown), so that a magnetic force or forces can be provided between the coil C and the magnetic elements M so that the electromagnetic driving assembly ED can force (or drive) the holder 32 and the optical lens disposed therein to move together with respect to the base 31 along the optical axis O (Z-axis) to achieve auto-focusing, or when the optical lens is shaken, the aforementioned movement compensates, in order to achieve the purpose of an anti-shake function. Furthermore, before applying the driving signal, the holder 32 can be positioned in an initial position with respect to the base 31 by the first and second leaf springs 34 and 35.

Figure 5:
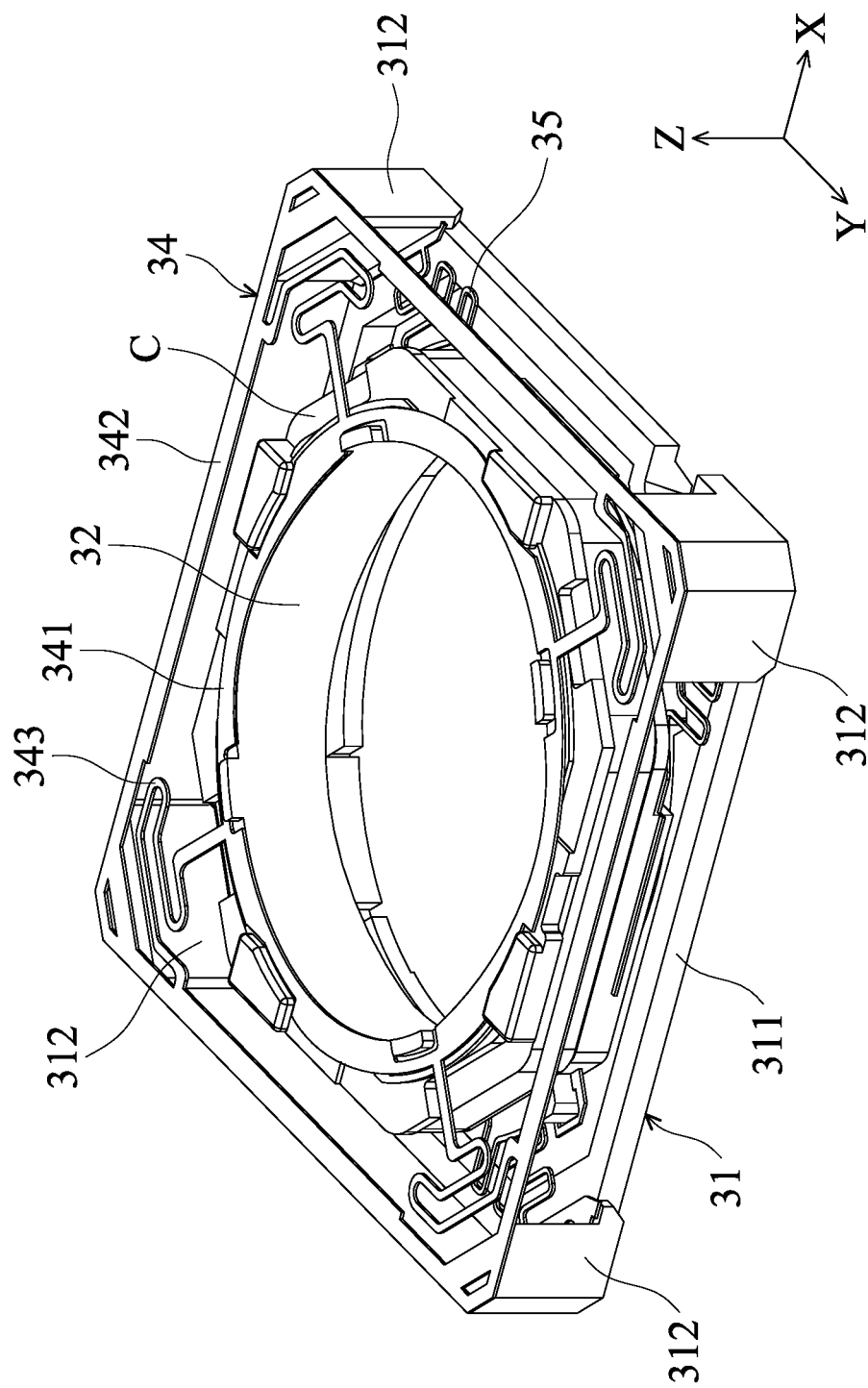
FIG. 5 is a schematic diagram of the first and second leaf springs connecting the holder to the base.

FIG. 5 is a schematic diagram of the holder 32 connecting to the base 31 via the first and second leaf springs 34 and 35. The base 31 has four protrusions 312 (such as protruding columns) respectively disposed on four corners of the main body 311 of the base 31. The first and second leaf springs 34 and 35 connect the protrusions 312 and the holder 32, so that the holder 32 is movably connected to the base 31. It should be noted that the first leaf spring 34 has an inner string structure 341, an outer string structure 342, and a bending structure 343. The inner string structure 341 has a substantially circular structure (shape) and is disposed on the holder 32, and the outer string structure 342 has a substantially rectangular structure (shape) and is disposed on the protrusions 312. The bending structure 343 connects the inner and outer string structures 341 and 342.

Figure 6:
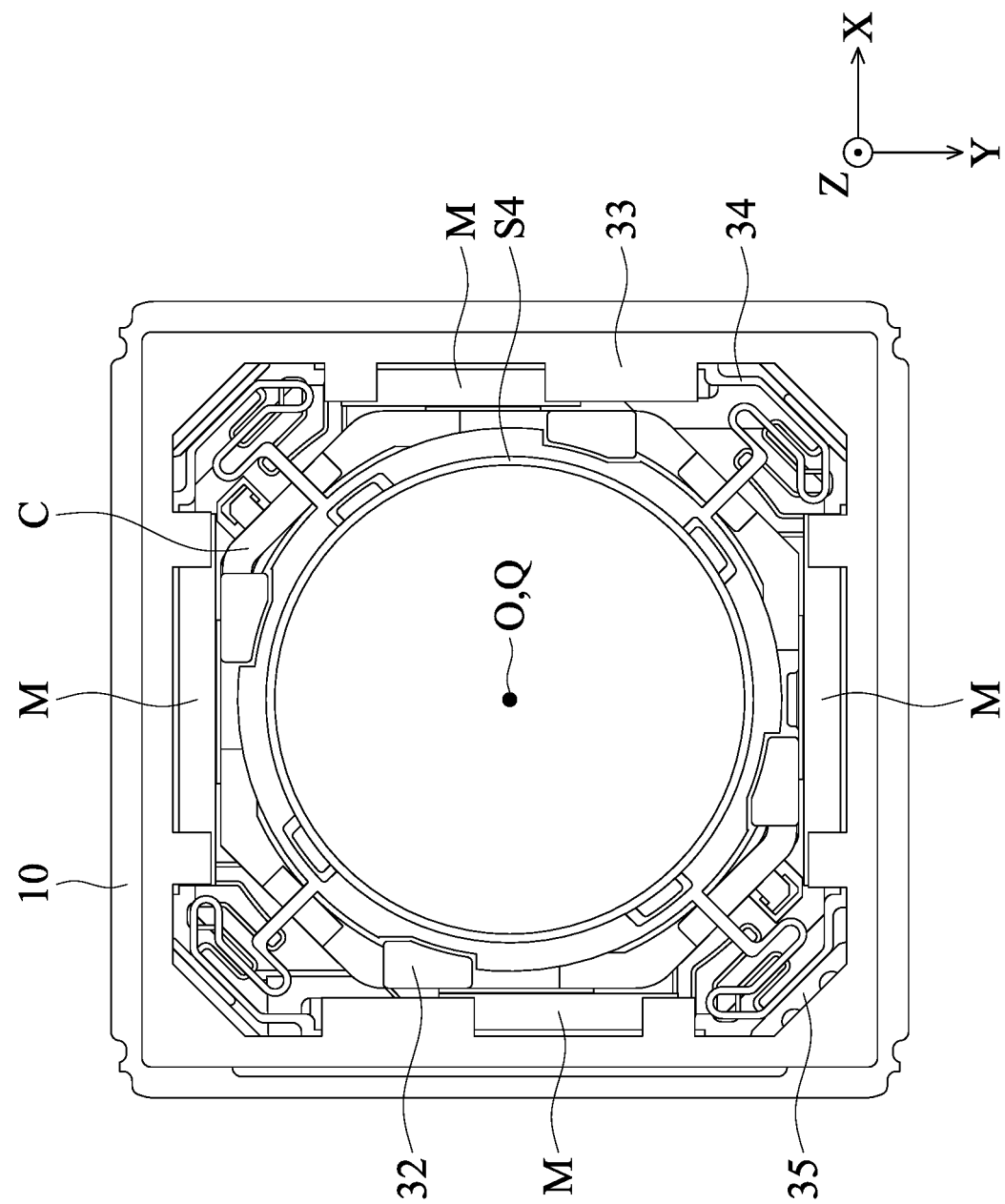
FIG. 6 is a top plan view diagram of the lens driving mechanism in FIG. 2 (the housing 20 is omitted).

It should be noted that the frame 33 exposes the holder 32 and the bending structure 343 of the first leaf spring 34 (the bending structure 343 is exposed) when viewed from the direction of the optical axis O, as shown in FIG. 6. Moreover, the frame 33 does not overlap with the holder 32 in the direction of the optical axis O. When the electromagnetic driving assembly ED forces the holder 32 and the optical lens to move upward relative to the base 31 and the frame 33 along the optical axis O, the holder 32 can move to a position that is higher than the upper surface of the frame 33 (the holder 32 protrudes from the upper surface of the frame 33), and the holder is restricted (limited) by the housing at a limit position X1 (please refer to FIGS. 7A-7B, the holder 32 is restricted due to it being in contact with (touching) the housing 20 when moving upward). In this way, compared to a transitional position-limiting mechanism/stopping mechanism in which the holder is limited by the inner frame, in the present embodiment, instead of the frame 33 serving as a stopping mechanism (the holder 32 does not touch or contact the frame 33), the housing 20 is configured to limit the holder 32. Therefore, the distance of movement of the holder 32 in the housing 20 (in the direction of the optical axis O) is effectively increased so that the auto-focusing and optical image stabilization of the optical driving mechanism 1 are improved, and it is possible to reduce the thickness of frame 33 in the direction of the optical axis O (due to it no longer serving as the stopping mechanism), thereby achieving the purpose of miniaturization.

Next, the connection of the movable portion 30 to the bottom plate 10 is described in detail below.

Figure 8:
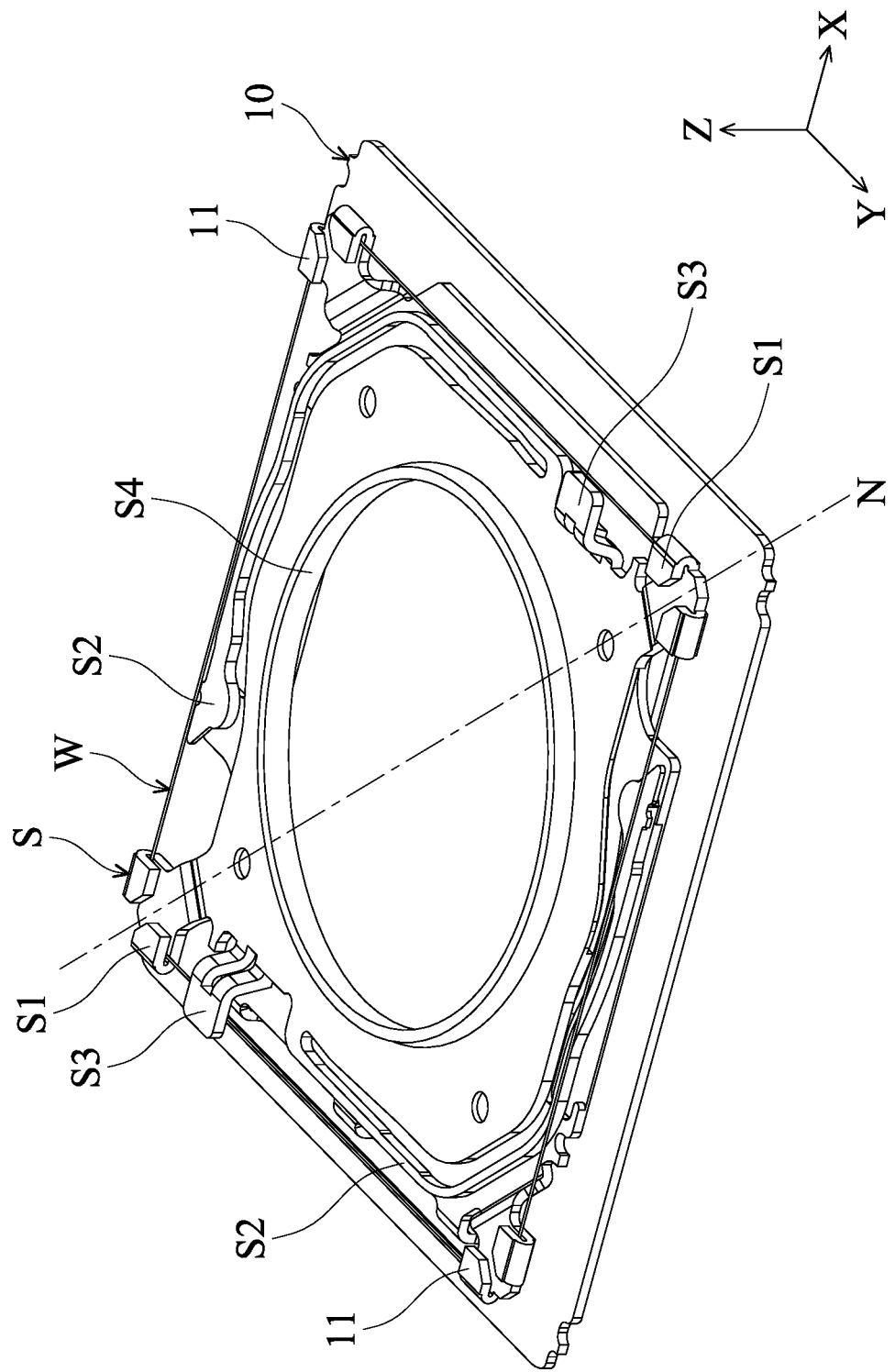
FIG. 8 is a schematic diagram of connection of the bottom plate, the elastic member and the biasing assembly.

Please refer to FIGS. 1, 2 and 8, in which the bottom plate 10 has a central axis Q, wherein the optical axis O coincides with the central axis Q when the optical lens (disposed in the movable portion 30) is in the initial position. The bottom plate 10, which may be a flexible printed circuit board (FPCB), is disposed under the base 31 of the movable portion 30, and the elastic member S and the biasing assembly W are disposed between the bottom plate 10 and the base 31 (of the movable portion 30). The bottom plate 10 and the base 31 are connected to each other by the biasing assembly W and the elastic member S.

More specifically, still referring to FIGS. 2 and 8, the biasing assembly W has four elongated biasing wires that correspond to the four sides of the bottom plate 10 (with a substantially rectangular structure). The two ends of each biasing wire are respectively connected to the fixed portion 11 of the bottom plate 10 and the connecting portion S1 of the elastic member S, wherein the fixed portion 11 and the connecting portion S1 extend along the direction of optical axis O (Z-axis) and extend toward the base 31. The elastic member S is disposed between the bottom plate 10 and the base 31 and connects them.

The biasing assembly W, including a plurality of biasing wires made of a shape-memory alloy (SMA) material, is also connected to the bottom plate 10 and the movable portion 30. The lengths of the biasing wires can be changed by applying driving signals (e.g., electrical current) to the biasing wires from an external power source (not shown). For example, when applying one or more driving signals to heat the biasing assembly W, the biasing assembly W is able to deform (e.g., become elongated or shortened). When the application of the driving signals is stopped, the deformed biasing assembly W will recover to its original length. In other words, by applying one or more appropriate driving signals, the length of the biasing assembly W can be controlled to move the movable portion 30 (including the holder 32 and the optical lens) relative to the bottom plate 10, to alter the posture (position) of the movable portion 30. Thus, the lens driving mechanism 1 has the function of optical-shaking compensation and optical-image stabilization.

The biasing assembly W, for example, may include a titanium-nickel (TiNi) alloy, a titanium-palladium (TiPd)

alloy, a titanium-nickel-copper (TiNiCu) alloy, a titanium-nickel-palladium (TiNiPd) alloy, or a combination thereof.

Still referring to FIGS. 2 and 8, the elastic member S (such as a sheet spring) has a metal material and a substantially rectangular structure, and includes two arms S2 and two protruding portions S3 which are respectively connected to (or which contact) the movable portion 30 and the bottom plate 10. The elastic member S (the arms S2 and the protruding portions S3 thereof) may be connected to conductive wires (not shown) which are formed on the bottom plate 10 and the base 31 of the movable portion 30 by insert molding or 3D molded interconnect device (MID) technology. Thus, those conductive wires are connected to the four biasing wires via the elastic member S to form four respective independent circuits, whereby driving signals (e.g., current) can be supplied to those biasing wires (the biasing assembly W) respectively from an external power source via the conductive wires, and the length of each of the biasing wires can be changed so that the movable portion 30 can move relative to the bottom plate 10.

It should be noted that, due to the conductive wires formed on the base 10 and the bottom 20 by insert molding or 3D molded interconnect device technology, the number of components of the lens driving mechanism 1 can be reduced and the dimensions thereof can be greatly decreased.

As shown in FIG. 8, the four biasing wires of the biasing assembly W are respectively disposed on the four sides of the bottom plate 10 and corresponding to the four sides of the lower surface of the base (FIG. 2). Each side of the bottom plate 10 is provided with one fixed portion 11 and one connecting portion S1 which are connected via the biasing wire. Specifically, the two fixed portions 11 and the two connecting portions S1 are respectively disposed at the four corners of the bottom plate 10 and positioned in a staggered configuration (that is, any two adjacent corners are provided with one connecting portion S1 and one fixed portion 11). Furthermore, the substantially rectangular bottom plate 10 defines a diagonal line N, and the four biasing wires and the connecting portions S1 are substantially symmetrical to the diagonal line N.

Figure 7A:
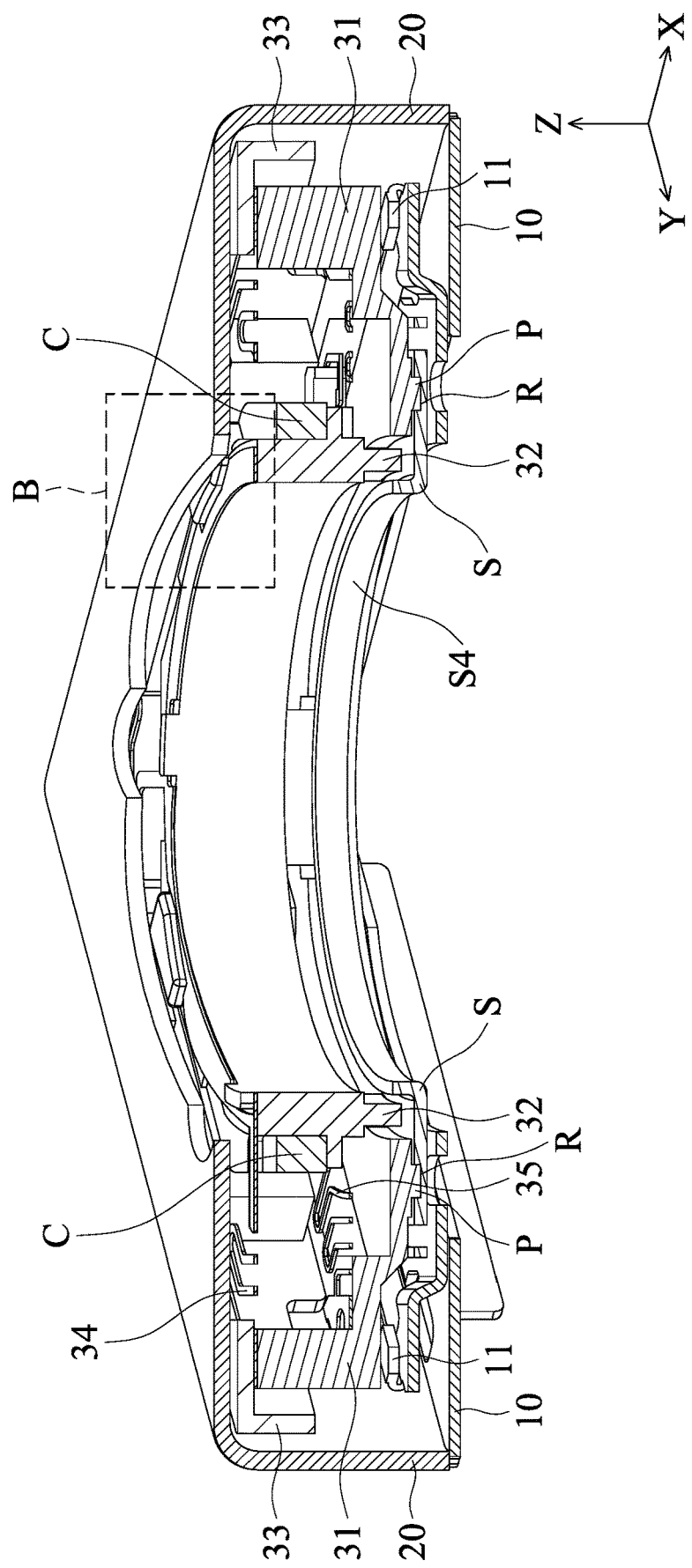
FIG. 7A is a sectional view diagram of the lens driving mechanism in FIG. 1 after assembly taken along line A-A.
Figure 7B:
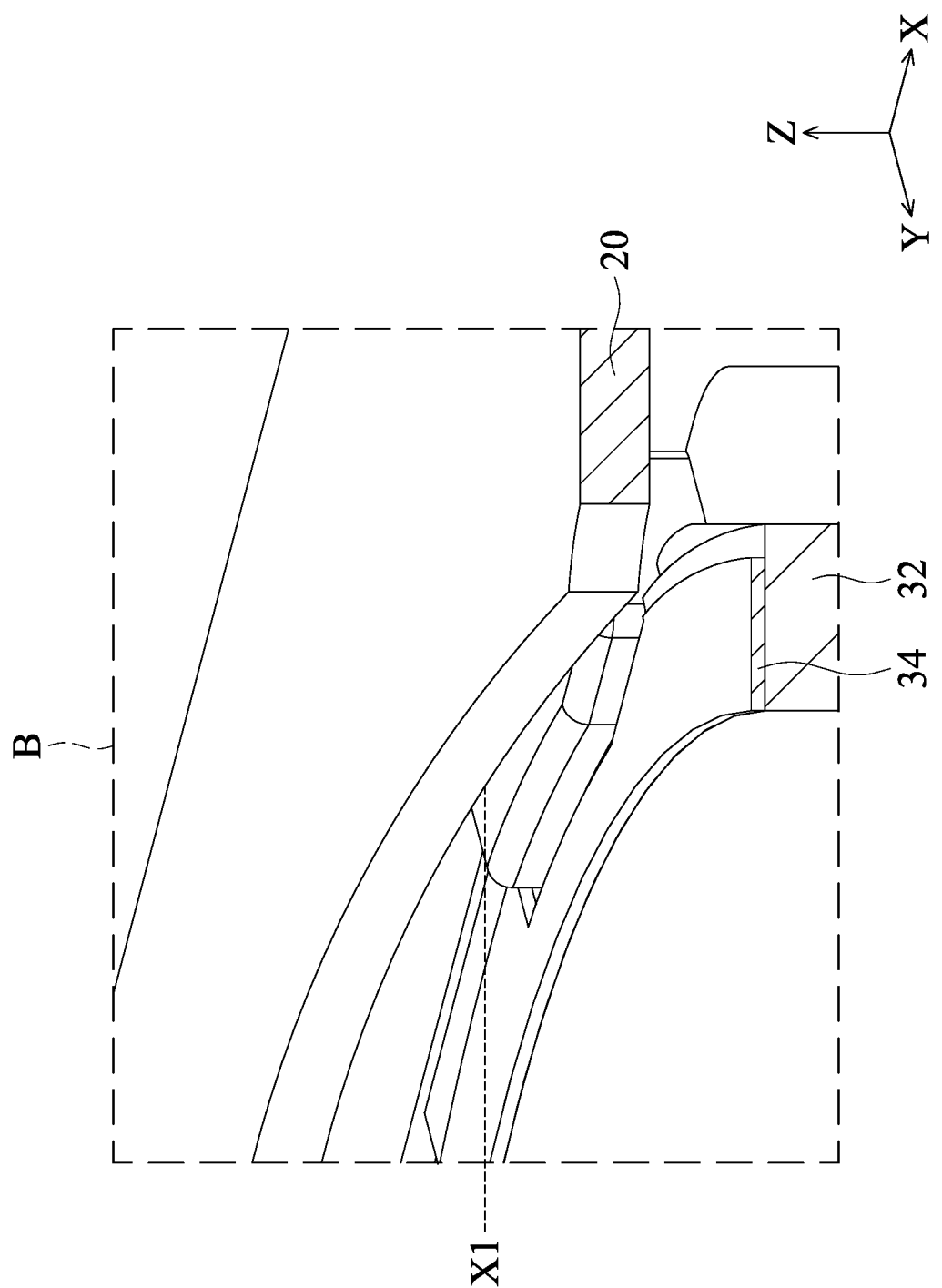
FIG. 7B is an enlarged view diagram of the area B in FIG. 7A.

In addition, the opening of the elastic member S is formed with a circular-shaped (or substantially circular-shaped) flange structure S4, extending along the central axis Q/optical axis O and toward the holder 32. As shown in FIGS. 6 and 7A, the flange structure S4 is received in the holder 32 and overlaps with the holder 32 (the flange structure S4 and the holder 32 are overlapping) in a direction that is perpendicular to the optical axis O, and is closer to the central axis Q/optical axis O than the holder 32. By forming the flange structure S4, it is possible to avoid or reduce the amount of external dust or particles that can enter the holder 32 and impair the optical lens, thereby greatly improving the product.

Referring to FIGS. 2 and 8, when applying the appropriate driving signals to the biasing assembly W, the biasing assembly W deforms (e.g., by being shortened or elongated) so that the movable portion 30 (and the optical lens disposed therein) are moved relative to the bottom plate 10, to achieve optical image stabilization.

Two types of motion of the movable portion 30 relative to the bottom plate 10 may be applied: the movable portion 30 may move linearly relative to the bottom plate 10 in a direction that is substantially perpendicular to the central axis Q (XY-plane), or the movable portion 30 may rotate around the central axis Q. Thus, the positional and angular compensation for the movable portion 30 can be accomplished by controlling the deformation of the biasing assembly W which receives the appropriate drive signal. In addition, since the movable portion 30 and the bottom plate 10 are also connected through the elastic member S, when the drive signals have not yet been applied to the biasing assembly W, the movable portion 30 can be positioned by the elastic member S in an initial position with respect to the bottom plate 10.

With respect to the movement of the movable portion 30 relative to the bottom plate 10, for example, as shown in FIG. 8, when appropriate drive signals are applied to the two biasing wires which are opposite each other in FIG. 8, causing them to elongate and contract, respectively (the elongated biasing wire elongates toward the connecting portion 11; the contracted biasing wire contracts toward the fixed portion 11), the biasing assembly W forces the movable portion 30 to move linearly in a direction that is perpendicular to the central axis Q with respect to the bottom plate 10. Similarly, when applying appropriate drive signals to these two biasing wires, causing both them to contract, the biasing assembly W forces the movable portion 30 to rotate around the central axis Q relative to the bottom plate 10.

Alternatively, in some embodiments, the biasing assembly W may include one biasing wire disposed on a side of the bottom plate 10, and a guiding mechanism (such as a guiding rail, not shown) is correspondingly provided for guiding the movable portion 30, to force the movable portion 30 to move linearly or rotate relative to the bottom plate 10.

Moreover, as shown in FIG. 7A, when viewed in a direction parallel to the XY plane, the two fixed portions 11 of the bottom plate 10 (where the biasing assembly W is connected) partially overlap with the base 31. Namely, the biasing assembly W and the base 31 partially overlap when viewed in a direction perpendicular to the optical axis O of the optical lens (parallel to the XY plane).

As shown in FIG. 8, both of the connecting portions S1 and the protruding portions S3 of the elastic member S protrude upwardly toward the movable portion 30 in the Z direction. Here, the protruding portions S3 are higher than the connecting portions S1 of the elastic member S.

As shown in FIG. 3, the holder 32 partially overlaps with an upper surface 310 of the base 31 when viewed in the direction of the optical axis O. Hence, when the holder 32 moves downward to a limit position relative to the base 31, the upper surface 310 of the base 31 can contact the holder 32, so as to restrict the holder 32 in the limit position.

Referring to FIGS. 2 and 4, the frame 33 forms an opening 331 located above the protruding portion S3 of the elastic member S. Referring to FIGS. 3 and 7A, the base 31 forms at least a nub P, and the elastic member S forms at least a recess R for receiving the nub P, so that the base 31 can be held and positioned on the elastic member S. Additionally, when viewed in the direction of the optical axis O, as shown in FIGS. 2 and 6, the biasing assembly W is not exposed and does not protrude outwardly from the movable portion 30 in the direction perpendicular to the optical axis O.

In summary, a lens driving mechanism is provided, configured to drive an optical lens, primarily including a bottom plate, a housing, a movable portion, and a biasing assembly. The housing is disposed on and connected to the bottom plate. The movable portion and the biasing assembly are disposed in the housing. The movable portion has a base and a holder, wherein the holder is configured to hold an optical lens and is connected to the base. The biasing assembly connects the bottom plate to the movable portion, and is configured to force the movable portion to move relative to the bottom plate. When the holder moves to a limit position relative to the base, the holder contacts the housing. In this way, the optical driving mechanism has a better focusing function and better optical shaking compensation due to a larger space being provided for the holder to move, thereby improving image quality. Furthermore, because the holder is restricted by the housing, the overall size of the lens driving mechanism can be reduced because there are fewer restriction/stopping mechanisms for the holder.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A lens driving mechanism, configured to drive an optical lens, comprising:
   a bottom plate;
   a housing, connected to the bottom plate;
   a movable portion, movably received between the housing and the bottom plate, including a frame, a holder, and a base, wherein the holder is received in the frame and configured to sustain the optical lens, and the base is connected to the frame and the holder; and
   a biasing assembly, connecting the bottom plate to the base of the movable portion, wherein when viewed in a direction perpendicular to the optical axis, the base and the biasing assembly partially overlap.

2. The lens driving mechanism as claimed in claim 1, further comprising an elastic member disposed on the bottom plate, wherein the biasing assembly includes a plurality of conductivity wires electronically independent from each other, and each of the conductivity wires is connected to a fixed portion of the bottom plate and a connecting portion of the elastic member, wherein the base and the fixed portion partially overlap when viewed in the direction perpendicular to the optical axis.

3. The lens driving mechanism as claimed in claim 2, wherein the elastic member forms a protruding portion extending toward the movable portion along the optical axis, and the protruding portion is higher than the connecting portion of the elastic member.

4. The lens driving mechanism as claimed in claim 1, wherein the biasing assembly includes shape-memory alloy (SMA) material.

5. The lens driving mechanism as claimed in claim 1, wherein the biasing assembly includes a plurality of conductivity wires comprising titanium-nickel (TiNi) alloy, titanium-palladium (TiPd) alloy, titanium-nickel-copper (TiNiCu) alloy, or titanium-nickel-palladium (TiNiPd) alloy.

6. The lens driving mechanism as claimed in claim 1, wherein the holder and the base partially overlap when viewed along the optical axis.

7. The lens driving mechanism as claimed in claim 6, wherein the frame forms an opening located corresponding to the protruding portion of the elastic member.

8. The lens driving mechanism as claimed in claim 1, further comprising an elastic member connected to the bottom plate and the base, wherein the elastic member forms a protruding portion extending toward the movable portion along the optical axis.

9. The lens driving mechanism as claimed in claim 1, further comprising an elastic member connected to the bottom plate and the base, wherein the base forms a nub, and the elastic member forms a recess for receiving the nub.

10. The lens driving mechanism as claimed in claim 1, wherein when viewed along the optical axis, the biasing assembly does not protrude from the movable portion in the direction perpendicular to the optical axis.

11. The lens driving mechanism as claimed in claim 1, wherein the movable portion further includes a first leaf spring and a second leaf spring, the first leaf spring is connected between the holder and the frame, and the second leaf spring is connected between the holder and the base.

12. The lens driving mechanism as claimed in claim 11, wherein the frame is sandwiched by the first and second leaf springs.

13. The lens driving mechanism as claimed in claim 11, wherein the first and second leaf springs are substantially perpendicular to the optical axis.

14. The lens driving mechanism as claimed in claim 1, wherein the holder is movably connected to the base, and when the holder moves to a limit position relative to the base, the holder is in contact with the housing.

15. The lens driving mechanism as claimed in claim 1, wherein the frame does not overlap with the holder when viewed along the optical axis.

16. The lens driving mechanism as claimed in claim 15, wherein when the holder moves to the limit position, the holder protrudes from the frame.

17. The lens driving mechanism as claimed in claim 15, wherein the movable portion further includes an electromagnetic driving assembly disposed on the frame and the holder and configured to force the holder to move relative to the base.

18. The lens driving mechanism as claimed in claim 17, wherein the electromagnetic driving assembly has at least one magnetic element disposed on the frame, and the frame exposes the magnetic element in the direction of the optical axis.

19. The lens driving mechanism as claimed in claim 18, wherein the movable portion further includes a glue disposed on an upper surface of the magnetic element, and the glue connects the upper surface and the frame.

* * * * *